Figure 1:
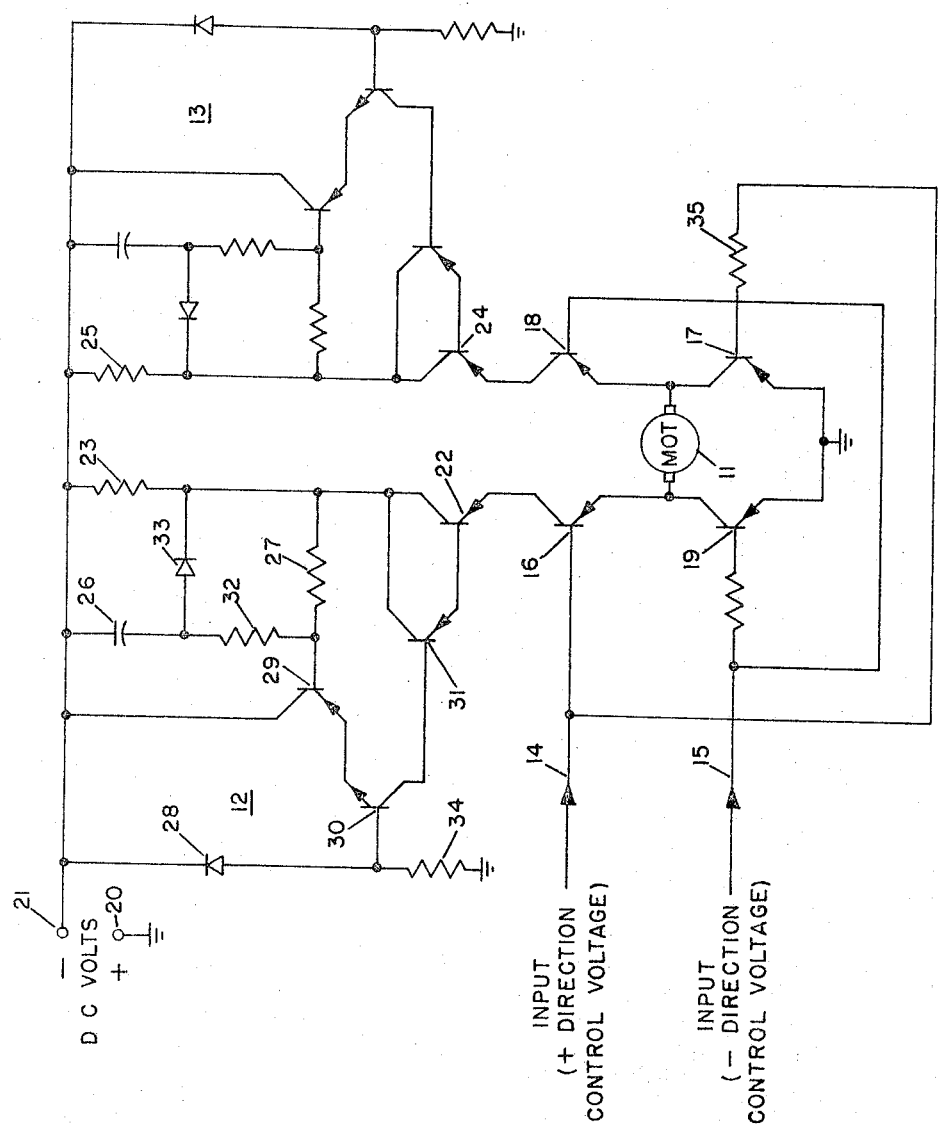

July 18, 1967

R. K. LIVENGOOD ETAL 3,332,007

MOTOR CONTROL CIRCUIT WITH TIME DELAY

Filed Aug. 20, 1964

RAY K. LIVENGOOD
ROBERT N. MILLER
INVENTORS

BY

*Glenn H. Antrim*

AGENT

United States Patent Office 3,332,007
Patented July 18, 1967

3,332,007
MOTOR CONTROL CIRCUIT WITH TIME DELAY
Ray K. Livengood, Torrance, Calif., and Robert N. Miller, Dallas, Tex., assignors to Ling-Temco-Vought, Inc., Dallas, Tex., a corporation of Delaware
Filed Aug. 20, 1964, Ser. No. 390,953
6 Claims. (Cl. 323—9)

This invention pertains to current control circuits for protecting motors from application of harmful overload currents, and particularly to circuits of systems in which high currents for short durations are desirable but for longer periods are harmful to the motors controlled thereby.

Motor control circuits of this invention have been used in plotters to control motors for moving respective styli rapidly in the direction of X-axis coordinates and to control motors for moving the same respective styli in the direction of Y-axis coordinates. Since rapid response is desirable, each plotter for each axis uses a small motor with small starting inertia. Current flow greater than that safely allowed by its rating for constant use is applied to the motor for short intervals to develop high torques when required to cause quick changes in velocity of the motor and the stylus that it controls. Therefore, a current control circuit is provided for each motor to supply a predetermined maximum current flow initially in response to the closing of a switching circuit but to decrease flow gradually thereafter to a normal value that can be applied to the motor constantly without damaging the motor.

Accordingly, the motor control system of this invention comprises a motor, an electrical time delay circuit, a voltage reference circuit, a bias control circuit, and an electron control device, the electron control device having a current emitting-collecting circuit and a control circuit, a source of current capable of supplying a predetermined maximum current flow that is greater than the current flow that can be applied constantly to the motor without damaging it; and operating circuit including the motor, the emitting-collector circuit of the electron control device, and the time delay circuit serially connected across the source of current; the bias control circuit being connected to the time delay circuit, the voltage reference circuit, and the control circuit of the electron control device; the bias control circuit controlling the conductivity of the electron control device in accordance with voltage developed across the time delay circuit, the emitting-collecting circuit of the electron control device normally being conductive to energize the motor, the voltage across the time delay circuit normally being comparatively low, the voltage across the delay circuit increasing gradually after an abnormal abrupt increase of current above a normal value in the operating circuit, the voltage across the time delay circuit being compared with the voltage across the voltage reference circuit, and the bias control circuit in response to the application of increasing voltage that is present in the time delay circuit as result of abnormally high current flow in the operating circuit changing the bias on the control circuit of the electron control device, thereby to decrease the conductivity of the emitting-collecting circuit until the current flow through the motor is at least as low as the current that can be applied constantly to the motor without damaging it.

An object of this invention is to permit an abnormally high operating current to be applied to a motor in response to a demand for an allowable maximum current flow, but to decrease this operating current gradually to a lower normal value to prevent damage should the demand for maximum current be sustained.

Figure 2:
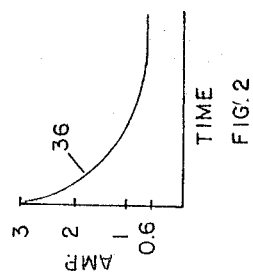

Other objects and advantages will be apparent from the specification and claims and from the accompanying drawing illustrative of the invention in which:

FIG. 1 is a schematic diagram of a voltage control circuit of this invention; and FIG. 2 is a curve to show the gradual limiting action of the current control circuit when demand for maximum current is sustained.

In the accompanying schematic, two identical current-limiting control circuits 12 and 13 are shown for operating a direct-current permanent-magnet motor 11. Each circuit is effective to limit current for a respective direction of rotation of the rotor of the motor 11. Since the circuit that is shown is particularly applicable to a coordinate plotter, the directions of rotation are labeled positive ("+" direction) and negative ("−" direction) in accordance with the directions of movement of a stylus that is coupled to a motor of the plotter. When control voltage of proper polarity is applied to an input 14, current flow is controlled by the current limiting circuit 12. The rotation of the motor is in a direction to move a stylus in a direction for inscribing a mark or trace in a "+" direction of a coordinate axis. When a control voltage of the proper polarity is applied to an input 15, current flow to the motor 11 is controlled by the current limiting circuit 13. The rotation of the rotor of the motor is in an opposite or "−" direction to move the stylus in an opposite direction.

A bridge circuit arrangement of type PNP, power transistors 16–19 functions as a double-pole, double-throw reversing switch, with controllable resistors in series with each circuit, to determine the amount and direction of current flow through the energizing circuit of the motor 11. The transistors 16 and 17 are conductive in response to application of negative control voltage to the input 14 to connect the motor through the limiting circuits 12 to terminals 20 and 21 of a source of direct current, and the transistors 18 and 19 are likewise conductive in response to application of a negative control voltage to the input 15 to connect the motor 11 through the limiting circuits 13 to the terminals 20 and 21.

In detail, the emitters of the type PNP power transistors 17 and 19 are connected to a ground terminal that is connected to the positive terminal 20 of the source of direct current. The collector of the transistor 19 and the collector of the transistor 17 are connected to the emitter of transistor 16 and the emitter of transistor 18, respectively. The emitter of the transistor 16 and the collector of the transistor 19 are also connected to one terminal of the motor 11, and the emitter of the transistor 18 and the collector of the transistor 17 are also connected to the other terminal of the motor 11. The principle circuits for completing the power circuits from the motor switching circuits may be traced from the collector of the transistor 16 through a type PNP power transistor 22 and a series resistor 23 of the limiting circuit 12 to the power terminal 21, and similarly from the collector of the transistor 18 through a transistor 24 and a series resistor 25 of the limiting circuit 13 to the terminal 21.

The limiting circuit 12 includes the power transistor 22, that is normally conductive, in series with the resistor 23. Voltage across resistor 23 is developed to provide a delayed control voltage. The amount of delay of the control voltage is namely determined by a capacitor 26 and a resistor 27. This delayed voltage in comparison with the voltage developed across a diode 28, controls the conductivity of serially connected bias control transistors 29, 30, and 31. Normally these control transistors 29–31 are conductive to provide base current for the series transistor 22. As the voltage across the capacitor 26 increases and approaches the voltage that is developed across the series resistor 23, when the motor current is too high for safe constant operation, the transistors 29–31 become less-conductive to decrease the base current of the series transistor 22. The conductivity of the transistor 22 is thereby decreased to lower the current that is supplied to the motor to a safe value.

In detail, the emitter of the transistor 22 is connected to the collector of the transistor 16. The collector of the transistor 22 is connected through the resistor 23 to the negative terminal 21 of a source of current. A delay circuit connected across the series resistor 23 may be traced from the junction of resistor 23 and the collector of the transistor 22 through the resistor 27 and a resistor 32 to one plate of the capacitor 26. The other plate of the capacitor 26 is connected to the negative terminal 21 of the source of current. A diode 33 is connected from the junction of capacitor 26 and the resistor 32 to that terminal of the series resistor 23 that is connected to the collector of the transistor 22. The sense of the diode 33 is such that it becomes conductive when the voltage on its electrode that is connected to the capacitor 26 is more positive than the voltage on its electrode that is connected to the resistor 23. When high current flow through the motor decreases abruptly so that the voltage across the resistor 23 becomes less than the delayed voltage across the capacitor 26, the capacitor 26 discharges through the diode 33 until the voltage that is across the capacitor becomes substantially equal to that voltage that is developed across the resistor 23 by the lower motor current.

The control transistors 29 and 30 operate as a differential amplifier or voltage comparator and the bias control transistor 31 is connected as an amplifier to control the base current of the series transistor 22. The base of the transistor 22 is connected to the emitter of the type PNP transistor 31 and the collector of the transistor 31 is connected to the collector of the series transistor 22. The conductivity of the series transistor 22 is obviously dependent upon the conductivity of the emitter-collector circuit of the transistor 31. Similarly, the conductivity of the transistor 31 is dependent upon the conductivity of the transistors 29 and 30. The base of the transistor 31 is connected to the collector of transistors 29 and 30. The base of the transistor 31 is connected to the collector of a type NPN transistor 30; the emitter of the transistor 30 is connected to the emitter of the type PNP transistor 29; and the collector of the transistor 29 is connected to the negative terminal 21 of the source of current. Therefore, the circuit for supplying the control current for the transistor 31 extends through the emitter-collector circuits of both the transistors 29 and 30.

The conductivity of the transistors 29 and 30 for controlling the conductivity of the transistors 31 and 22 is controlled by the difference between the voltage that is derived from the circuit for charging the capacitor 26 and the reference voltage that is developed across the diode 28. The anode of the diode 28 is connected through resistor 34 to ground that is connected to terminal 20 of the source of current, and the cathode of the diode 28 is connected to the negative terminal 21 of the source. The base of the transistor 30 is connected to the junction of the resistor 34 and the anode of the diode 28, and the base of the transistor 29 is connected to the junction of the resistors 27 and 32.

The following values of component parts are those for a typical circuit for controlling a motor to which approximately 0.6 ampere of current may be applied constantly without damaging the motor. When the voltage between the terminals 20 and 21 is about 28 volts, over 2.0 amperes of current may be applied to the motor for short intervals.

| Component | | Value |
|---|---|---|
| Resistor 23 | ohms | 1 |
| Resistor 27 | do | 4,700 |
| Resistor 32 | do | 680 |
| Resistor 34 | do | 5,000 |
| Capacitor 26 | μf | 22 |
| Transistors 16, 19, 22 | type | 2N1358 |
| Transistors 29, 31 | do | 2N526 |
| Tranisistor 30 | do | 2N388A |
| Diodes 28, 33 | do | 1N645 |

In describing below the operation of a typical circuit with values of components listed above, typical operating voltages and currents are used to aid in understanding the operation. Before command signals are applied to the inputs 14 and 15, a voltage of +5 volts is applied to both inputs to prevent operation of the motor 11. To obtain maximum current flow through the motor circuits in the direction for rotating the rotor of the motor in a "+" direction, a command signal of −24 volts is applied to the input 14. This voltage is applied to the base of the transistor 16 and through the voltage-dropping resistor 35 to the base of the transistor 17. Transistors 16 and 17 become saturated while transistors 18 and 19 remain cut-off. Current flows from ground, through the emitter-collector circuit of the transistor 17, the winding of the motor 11, the emitter-collector circuit of the transistor 16, the emitter-collector circuit of the transistor 22, the resistor 23 to the terminal 21 to which is applied −28 volts. The current flow through the motor is initially in excess of 2 amperes as shown in FIG. 2. A small portion of the current, for example, 50 milliamperes, flows from the base of the transistor 22 through the emitter-collector circuit of the bias control transistor 31.

During normal operation, assume that the current flow through the motor circuit should not exceed 0.5 ampere, and therefore the voltage drop across the 1-ohm resistor 23 should not exceed 0.5 volt. Therefore, the voltage across the capacitor 26 that is derived from charging current through resistors 27 and 32 cannot exceed 0.5 volt. When the voltage supplied from terminal 21 is −28 volts, the voltage that is applied to the base of the transistor 29 is −27.5 volts, and the voltage on the emitters of the transistors 29 and 30 is less negative by the amount of the voltage drop across the emitter-base circuit of the transistor 29 and the voltage drop across the resistor 27. Now assuming that the current flow through the diode 28 provides a constant voltage drop of 0.6 volt, the voltage that is applied to the base of the transistor 30 is −27.4 volts. The emitter of the type NPN transistor 30 is therefor negative relative to its base so that current flows from the motor switching circuit through the emitter-base circuits of the transistors 22 and 31, the emitter, collector circuit of the transistor 30, and the emitter-collector circuit of the transistor 29 to the terminal 21 of the source of current. The base current circuit for the series transistor 22 is therefore completed through the emitter-collector circuit of the transistor 30.

When an input signal of −24 volts is applied to the input 14 while the motor 11 is heavily loaded, the current through the windings of the motor and through the resistor 23 might exceed 2 amperes as shown by the left portion of the curve 36 of FIG. 2. When the current is 2.0 amperes, the voltage drop across the resistor 23 is 2 volts, and the capacitor 26 starts to charge through the resistors 27 and 32. When the increase in voltage across the resistor 23 is abrupt, the voltage developed across the resistor 32 by the current for charging the capacitor 26 is sufficient to cause the voltage on the base of the transistor 29 to approach the −27.4 volts that is applied from the diode 28 to the base of the transistor 30. The conductivity of the transistor 29, 30, and 31 decreases immediately to cause a decrease in conductivity of the series transistor 22 to decrease the current flow in the motor circuit. The voltage drop across the resistor 23 gradually decreases while the voltage drop across the capacitor 26 increases to produce a steady state current flow at a safe value, for example, 0.6 ampere as shown by the right portion of the curve 36 of FIG. 2. The resistor 32 may be omitted to provide a short interval of constant maximum current before the charge on the capacitor 26, as applied through the resistor 27, becomes sufficient to cause the voltage that is applied to the base of the transistor 29 to approach the reference voltage that is controlled by the diode 28 and to cause a decrease of conductivity of the bias control resistors 29–31.

In response to a sudden drop in the demand on motor 11 while the capacitor 26 is charged to a higher value than normal as a result of high motor current, the voltage across the diode 33 changes to the proper polarity to connect the capacitor directly across the resistor 23 to discharge the capacitor until the voltage across it substantially equals the voltage drop across the resistor 23.

When the voltage applied to the input 14 is +5 volts and the voltage applied to the input 15 is −24 volts, transistors 16 and 17 of the motor switching circuit become non-conductive and the transistors 18 and 19 become conductive. The current for operating the motor in a "−" direction flows from ground through the emitter-collector circuit of the transistor 19, the winding of the motor 11, the emitter-collector circuit of the transistor 18, the emitter-collector circuit of the series transistor 24, the series resistor 25 to the terminal 21 of the source of direct current. The transistor 24 of the current limiting circuit 13 corresponds to the transistor 22 of the current limiting circuit 12 and similarly is normally conductive according to the the description above for the current limiting circuit 12. Likewise, since the current limiting circuit 13 is identical to the current limiting circuit 12, the conductivity of the transistor 24 is decreased in response to high current flow through the series resistor 25.

The advantage of having two identical current limiting circuits 12 and 13 rather than a single limiter circuit becomes apparent when a command to reverse the direction of the motor 11 is initiated while the motor is stalled. When only one limiter circuit is used, a maximum torque in a reverse direction is not available.

In FIG. 1, a single circuit 12 may be utilized for most modes of operation by transferring the collector of the transistor 18 from the emitter of the transistor 24 of the current limiter 13 to the emitter of the transistor 22 of the current limiter 12 so that the collectors of both the transistors 16 and 18 are connected to the current limiter 12. While only the limiter 12 is being used, assume that a voltage of −24 volts is being applied to the input 15 to cause the rotor of the motor 11 to rotate in a "−" direction and that the rotor is exerting high torque because of a heavy load or because the output device to which the motor is coupled has been operated to its extreme position against a stop. Under such a condition, the current through the series resistor 23 is high and the capacitor 26 is charged to a high value.

The high current flow as indicated at the left of the curve 36 of FIG. 2 is attained only while the capacitor 26 is charging. Therefore, if the capacitor 26 is charged, the current limiter 12 being used for both directions of operation of the motor 11, this high current flow for producing a high torque in a "+" direction, in response to a negative control voltage being switched from the input 15 to the input 14, is not available because the current flow through the resistor 23 is high at the instant that the input voltages are changed. When the complete circuit of FIG. 1 is used, the capacitor 26 of the current limiter 12 is fully discharged while the current limiter 13 is employed during application of input voltage for operating the motor 11 in a "−" direction. Therefore, maximum current and torque are available when the voltages to the inputs 14 and 15 are switched to reverse the direction of the motor 11.

A current limiting circuit similar to the current limiting circuits 12 and 13 described herein, is effective to decrease gradually current flow to any load that is connected in series therewith. In the instant circuit the motor 11 may be protected from overheating and more particularly for use in a plotter, the current to each motor is limited to prevent demagnetization of its permanent field magnet. The motors of the plotter are fully protected in the event one branch of the motor switching circuit is conductive and the motor is subjected to abnormally high torque output. Also, the motor is protected in the event of a sudden reversal. Assume that the motor 11 is operating fast in a "−" direction in response to a negative control being applied to the input 15. Then because of a requirement for quick reversal of the direction of operation of the motor 11, the voltage on the input 15 is changed to positive polarity and simultaneously the voltage on the input 14 is changed from positive polarity to negative polarity. The reversal of current flow tends to reverse the direction of operation of the motor but the inertia of the motor tends to maintain its rotation in the same direction. The motor then momentarily appears to operate as a generator with a winding that appears as negative resistance in series with the source of current, the series transistor 22 and the series resistor 23. A damaging impulse of current is prevented in the winding of the motor by operation of the limiting circuit 12 as described above to decrease the conductivity of its series transistor 22.

While only one embodiment of the invention, together with modifications thereof, has been described in detail herein and shown in the accompanying drawing, it will be evident that various further modifications are possible in the arrangement and construction of its components without departing from the scope of the invention.

We claim:

1. An overload control system comprising:
   a source of current, a varying load, a series resistor, an electron control device having an electron emitting-collecting circuit and a control circuit, said source of current, said load, said emitting-collecting circuit and said series resistor being serially connected,
   an amplifier having an output circuit and an input circuit,
   a delay circuit connected between said input circuit of said amplifier and said series resistor to apply a gradually increasing voltage to said input in response to an abrupt increase in current through said load,
   the output circuit of said amplifier being connected to control circuit of said electron control device,
   the output of said amplifier changing in response to change of voltage that is applied to its input as a result of an abrupt increase in current flow through said load to decrease gradually the conductivity of said electron control device, thereby, to decrease gradually the current flow through said load.

2. An overload control system comprising:
   a source of current, a varying load, a series resistor, an electron control device having an electron emitting-collecting circuit and a control circuit, said source of current, said load, said emitting-collecting circuit, and said series resistor being serially connected,
   a differential amplifier having an output circuit and first and second input circuits,
   a delay circuit connected between said second input circuit of said differential amplifier and said series resistor to apply a gradually increasing voltage to said input in response to an abrupt increase in current through said load,
   a source of reference voltage, said first input of said differential amplifier being connected to said source of reference voltage, the output circuit of said differential amplifier being connected to said control circuit of said electron control device, the output of said differential amplifier changing in response to change of voltage that is applied to its second input as a result of an abrupt increase in current flow through said load to gradually decrease the conductivity of said electron control device, thereby, to gradually decrease the current flow through said load.

3. An overload current control system comprising:

a source of current, a varying load, a series resistor, an electron control device having an electron emitting-collecting circuit and a control circuit, said source of current, said load, said emitting-collecting circuit and said series resistor being serially connected, a resistive-capacitive delay circuit connected to said series resistor to charge said capacitor gradually in response to an increase of current through said load, a differential amplifier having an output circuit and first and second input circuits, a source of reference voltage, said first input being connected to said source of reference voltage, said second input being connected to said resistive-capacitive delay circuit to receive a change of voltage that is delayed with respect to an increase in current flow through said load, said delayed voltage gradually approaching a steady state value in response to the current through said load becoming stable at an increased value, said output circuit of said differential amplifier being connected to said control circuit of said electron control devices, the output of said differential amplifier changing in response to change of voltage that is applied to its second input as a result of an abrupt increase in current flow through said load to gradually decrease the conductivity of said electron control device, thereby, to gradually decrease the current flow through said load.

4. A current control system having a delayed limiter comprising:

a source of current, a load, a series transistor, and a series resistor connected in series, a voltage delay circuit connected across said series resistor, said voltage delay circuit responsive to a sudden increase in voltage across said series resistor to develop gradually an increasing output voltage until a stable output voltage corresponding to the increased voltage across said series resistor is attained, a differential amplifier, a source of reference voltage, a bias control amplifier, said bias control amplifier being connected to said series transistor to change the conductivity of said series transistor in response to a change of input to said bias control amplifier, said differential amplifier having a first input connected to said voltage delay circuit for applying said increasing output voltage of said delay circuit to said first input thereof, and having a second input connected to said source of reference voltage for applying a stable voltage to said second input thereof, said differential amplifier having an output connected to the input of said bias control amplifier, and said differential amplifier being responsive to the voltage applied to said first input approaching the voltage applied to said second input to apply through said bias control amplifier to said series transistor a changing bias control voltage to decrease the conductivity of said series transistor with the changing output voltage of said voltage delay circuit.

5. A motor control system with a delayed current limiter comprising:

a source of current, a motor with an operating circuit, said current limiter comprising a series transistor, a series resistor, first, second, and third amplifier transistors, a voltage reference circuit, first and second time-delay resistors, a capacitor, and a diode, each of said transistors having an emitter-collector circuit and a base, means for connecting said emitter-collector circuit of said series transistor and said series resistor in series with said operating circuit, said first and second time-delay resistors and said capacitor being connected successively in series across said series resistor, said diode being connected across said first and second serially connected resistors such as to connect said capacitor directly across said series resistor when said diode is conductive, said diode normally being non-conductive, means for connecting the emitter-collector circuit of said first transistor between said base of said series transistor and said source in the sense to favor forward conduction of current therethrough, the base of said first transistor being connected successively through the emitter-collector circuit of said second transistor and the emitter-collector circuit of said third transistor to said source in a sense to favor forward conduction therethrough, the base of said second transistor being connected to said reference circuit, the base of said third transistor being connected to the junction of said first and second resistors, said transistors normally being conductive, the voltage that is applied between the base of said second transistor and the base of said third transistor decreasing in response to increased current flow through said series resistor to decrease the conductivity of said transistors and thereby to decrease gradually the current flow through said motor as said capacitor charges.

6. An overload control system comprising:

a two-terminal source of current, a varying load, first and second limiting circuits, each of said limiting circuits having a series resistor, an amplifier, a delay circuit, and an electron control device, each electron control device having an electron emitting-collecting circuit and a control circuit, said series resistor and said emitting-collecting circuit of each of said limiting circuits being connected together and having an end terminal connected to one terminal of said source, each of said amplifiers having an output circuit and an input circuit, each of said delay circuits being connected between said input of the respective one of said amplifiers and said series resistor for the respective one of said limiting circuits to apply a gradually increasing voltage to the respective one of said inputs in response to an abrupt increase of current through the respective one of said series resistors, the output circuit of each of said amplifiers being connected to said control circuit of said electron control device of said respective limiting circuit, switching means connected to the other terminal of said source, to said load, and to each of said limiting circuits in series with said respective emitting-collecting circuit and said respective series resistor, said switching means operable to one state of operation to cause current to flow from said source through said load in a forward direction and through said emitting-collecting circuit and series resistor of said first current limiting circuit, said switching means being operable to another position to cause current flow from said source through said load in a reverse direction and through said emitting-collecting circuit and series resistor of said second current limiting circuit, the output of each of said amplifiers changing in response to change of voltage that is applied to its input as a result of an abrupt increase of current flow through said load while said switching means is effective to connect the one of said limiting circuits that includes the respective amplifier, to decrease gradually the conductivity of said electron control device of said respective limiting circuit, thereby to decrease gradually the current flow through said load.

References Cited

UNITED STATES PATENTS

| | | | |
|---|---|---|---|
| 3,005,147 | 10/1961 | Thomas | 323—9 |
| 3,078,410 | 2/1963 | Thomas | 323—9 |
| 3,105,188 | 9/1963 | Harrison | 323—22 |
| 3,201,680 | 8/1965 | Ross et al. | 323—9 |
| 3,263,156 | 7/1966 | Isaacs | 323—22 |

JOHN F. COUCH, *Primary Examiner.*

M. L. WACHTELL, *Assistant Examiner.*